United States Patent
Burkhardt et al.

(10) Patent No.: US 6,775,625 B2
(45) Date of Patent: Aug. 10, 2004

(54) SYSTEM AND METHOD FOR NONDESTRUCTIVE TESTING SIMULATION

(75) Inventors: Gary L. Burkhardt, Adkins, TX (US); Jay L. Fisher, San Antonio, TX (US); Eric C. Peterson, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 12 days.

(21) Appl. No.: 10/605,089

(22) Filed: Sep. 8, 2003

(65) Prior Publication Data

US 2004/0117133 A1 Jun. 17, 2004

Related U.S. Application Data

(60) Provisional application No. 60/319,540, filed on Sep. 10, 2002.

(51) Int. Cl.[7] .................................................. G06F 17/40
(52) U.S. Cl. ......................................... 702/35; 703/14
(58) Field of Search ............................ 702/35, 5, 16, 702/33, 34, 36, 57–59, 150–153, 167, 168, 182, 183; 703/1, 6, 7, 14, 22

(56) References Cited

U.S. PATENT DOCUMENTS 3,910,124 A * 10/1975 Halsey ........................ 73/601
5,764,721 A * 6/1998 Light et al. ..................... 378/4
5,936,725 A * 8/1999 Pike et al. ................ 356/237.1
6,473,794 B1 * 10/2002 Guheen et al. ............. 709/223

* cited by examiner

Primary Examiner—Marc S. Hoff
Assistant Examiner—Edward Raymond
(74) Attorney, Agent, or Firm—Taylor Russell & Russell, P.C.

(57) ABSTRACT

The system and method provides an NDT inspector with a realistic simulation of inspecting a test piece while injecting virtual flaws for display on an NDT instrument, while also presenting actual flaws to the inspector. A conventional NDT test probe and instrument are connected to the system at the probe leads interface. The system provides means for monitoring probe position and probe liftoff, means for storing virtual flaw signals and associated locations on a test piece, and means for providing a virtual flaw signal to the NDT instrumentation to simulate the response of the actual probe. The invention provides for nondestructive test method qualification and probability of detection determination, for establishing and maintaining nondestructive testing proficiency of inspectors, for periodically presenting flaw signals to inspectors during routine inspections, and for ensuring sufficient scan coverage for detection of material defects in a test piece.

31 Claims, 6 Drawing Sheets

SYSTEM AND METHOD FOR NONDESTRUCTIVE TESTING SIMULATION

CROSS REFERENCE TO RELATED APPLICATIONS

This application claims benefit of U.S. Provisional Application No. 60/319,540, filed on Sep. 10, 2002.

BACKGROUND OF INVENTION

The invention relates generally to nondestructive methods for determining the integrity of components and structures. More particularly, the invention is a method and system for nondestructive test method qualification and probability of detection determination, for establishing and maintaining nondestructive testing proficiency of inspectors, for periodically presenting flaw signals to inspectors during routine inspections, and for ensuring sufficient scan coverage for detection of material defects in a test piece. The invention finds use in general nondestructive testing as well as where eddy current and ultrasound methods are used to detect the presence of flaws in components and structures.

Nondestructive testing (NDT) is used in many industries to detect the presence of flaws so that the integrity of components and structures may be determined. NDT involves using various test methods, such as eddy current and ultrasonics. Applications include military and civilian aircraft, fossil and nuclear electrical power generation equipment, petrochemical plants, etc. There are several needs within the NDT environment that, if satisfied, would significantly reduce inspection costs and improve the reliability and quality of inspections.

NDT method qualification and probability of detection (POD) determination is one area of need. Demonstration of the capability and reliability of new NDT techniques must often be done in a short period of time and at minimal cost. The present approach is to perform a POD study. These studies involve producing many test specimens with realistic flaws, training multiple NDT technicians, and conducting blind tests. Fabrication of the flawed specimens is very expensive and time consuming. As a result, a POD study is usually performed only for the most critical applications. A system and method to reduce costs and time required to implement POD studies is needed.

NDT inspectors must be trained to ensure proficiency in new and existing NDT procedures. Training is also required periodically in order to maintain proficiency of the inspectors through practice. Although specimens with realistic flaws are needed for training, they are often not available. Video-based training courses are available, but they do not provide "hands-on" experience with real flaws. Therefore, better training methods are another area of need.

Monitoring existing inspections when flaws are infrequent presents another area of need. In some routine inspections, flaws are encountered very infrequently, sometimes less than once per year. Inspectors may become conditioned to not expecting flaws, resulting in a loss of proficiency. A method is needed to periodically present simulated flaws to inspectors during routine inspections.

Ensuring that a thorough scan is conducted over an entire test piece in another area of need. Some inspections are performed by hand scanning, and the scanning coverage of the appropriate area is dependent on the skill and attention of the operator. A method is needed to monitor scan position so that proper coverage is obtained.

SUMMARY OF INVENTION

The present invention provides for a system and method that satisfies the needs for reducing costs and time required to implement POD studies, providing improved realistic training methods, presenting simulated flaws to inspectors during routine inspections, and for monitoring scan position to ensure proper coverage of test pieces. This invention performs the functions of an NDT inspection simulator analogous to flight simulators used to train aircraft pilots. The operations of the NDT simulator are transparent to the inspector using the system when realistic, virtual flaw signals are presented at preprogrammed locations on the actual test piece. The virtual flaw signals may be premeasured or generated from a model. This method of presenting virtual flaws provides the equivalent of real flaws to an inspector without the requirement for having actual flaws in a test piece. The inspector may use the same probes and instrumentation of a conventional NDT instrument that are normally used in the inspection process. The simulator may be connected between the probe and NDT instrument so that flaw responses will be injected into the instrument, and the operator may view a response on the actual NDT instrument display. The probe and instrument may remain "live", so that the interaction between the probe and the test piece remain active as well. The simulator may track the probe position so that responses from flaws can be injected at a selected location on the test piece.

The present invention enables POD tests to be accomplished without the need for manufacturing a large number of actually flawed test pieces. A training mode may be implemented in which the inspector receives instructions from the system and can practice with the equivalent of actual flawed test pieces. The system may be used with routine inspections to inject artificial flaw signals to keep inspectors alert, and may be used to monitor probe position in manual test scans to ensure proper coverage.

In another embodiment of the present invention, instead of injecting virtual flaws into a test instrument, the present invention may accept an output signal from an NDT test instrument, add virtual flaws to this signal within the system, and display the results on a computer monitor. This embodiment provides a virtual instrument for an inspector, who may view the computer monitor instead of the test instrument for conducting nondestructive tests.

An embodiment of the present is a method for nondestructive testing with flaw simulation, comprising the steps for storing a geometry of a test piece and a positional map of virtual flaw signals for the test piece in a control computer, causing a nondestructive testing probe to scan a test piece by movement of the probe over the test piece by an inspector, tracking nondestructive testing probe positions with respect to the test piece and sending probe position signals to the control computer, processing nondestructive testing probe output signals and displaying the processed signals to the inspector, injecting virtual flaw signals into the processed probe output signals based on the probe positions, the stored test piece geometry and the stored positional map for determining virtual flaw response signals, and displaying the virtual flaw response signals to the inspector. The steps for processing probe output signals and injecting virtual flaw signals may comprise the steps for sending excitation signals to the probe from conventional nondestructive test instrumentation through a virtual flaw signal injection circuit, receiving the probe output signals by a virtual flaw signal injection circuit, computing virtual flaw signals by the control computer based on the probe positions, the stored geometry of the test piece and the stored positional map of virtual flaw signals for the test piece, combining the probe output signals and the virtual flaw signals from the control computer by the virtual flaw signal injection circuit for determining the virtual flaw response signals, and sending the virtual flaw response signals from the virtual flaw signal injection circuit to the conventional nondestructive test instrumentation for displaying the virtual flaw response signals to the inspector by the conventional nondestructive test instrumentation. The method may further comprise sensing nondestructive testing probe liftoff from the test piece, sending probe liftoff signals to the control computer, and using the probe liftoff signals for computing virtual flaw signals. The steps for processing probe output signals and injecting virtual flaw signals may comprise the steps for sending excitation signals to the probe and receiving the probe output signals by conventional nondestructive test instrumentation, receiving output signals from the conventional nondestructive test instrumentation by the control computer, computing virtual flaw signals by the control computer based on the probe positions, the probe liftoff signals, the stored geometry of the test piece and the stored positional map of virtual flaw signals for the test piece, combining the conventional nondestructive test instrumentation output signals and the virtual flaw signals by the control computer for determining virtual flaw response signals, and sending the virtual flaw response signals from the control computer to a computer monitor for displaying the virtual flaw response signals to the inspector. The step for storing in a control computer may comprise the steps for reading and storing virtual flaw signals data, reading and storing the test piece geometry, generating one or more positional maps of virtual flaw signals for the test piece, and reading liftoff correction parameters. The step for computing virtual flaw signals by the control computer may comprise the steps for reading and storing the probe position signals, reading and storing the liftoff signals, reading and storing the positional map of virtual flaws, calculating virtual flaw signals using the probe position signals and the positional map, applying liftoff correction to the calculated virtual flaw signals, and sending the corrected virtual flaw signals to the virtual flaw signal injection circuit. The step for computing virtual flaw signals by the control computer may comprise the steps for reading and storing the output signals from the conventional nondestructive test instrumentation, reading and storing the probe position signals, reading and storing the liftoff signals, reading and storing the positional map of virtual flaws, calculating virtual flaw signals using the probe position signals and the positional map, applying liftoff correction to the calculated virtual flaw signals, and combining the corrected virtual flaw signals with the signals from the conventional nondestructive test instrumentation and sending the combined signals to the computer monitor. The nondestructive testing probe may be selected from the group consisting of an eddy current probe and an ultrasonic probe. A liftoff sensor may be selected from the group consisting of an eddy current sensor, a capacitive sensor and an optical sensor. The nondestructive testing probe may be selected from the group consisting of a single element probe for receiving excitation signals and transmitting test signals, a dual element probe for receiving excitation signals on one element and transmitting test signals from a second element, and a triple element probe for receiving excitation signals on one element and transmitting test signals differentially from the other two elements. The step for displaying the virtual flaw response signals may comprise the step for displaying the virtual flaw response signals and actual flaw response signals to the inspector. The method may further comprise the step for displaying virtual flaws to an inspector on a computer monitor connected to the control computer for instructional training purposes. The method may further comprise the step for deriving the positional map of virtual flaws from a model of conventional nondestructive test instrumentation responses. The method may further comprise the step for deriving the positional map of virtual flaws from actual premeasured flaw signals from conventional nondestructive test instrumentation. A computer-readable medium may contain instructions for controlling a computer system to implement the method above. A computer-readable medium may contain instructions for controlling a computer system to implement the step for computing virtual flaw signals disclosed above.

Another embodiment of the present invention is a system for nondestructive testing with flaw simulation that comprises means for storing a geometry of a test piece and a positional map of virtual flaw signals for the test piece in a control computer, means for causing a nondestructive testing probe to scan a test piece by movement of the probe over the test piece by an inspector, means for tracking nondestructive testing probe positions with respect to the test piece and sending probe position signals to the control computer, means for processing nondestructive testing probe output signals and displaying the processed signals to the inspector, means for injecting virtual flaw signals into the processed probe output signals based on the probe positions, the stored test piece geometry and the stored positional map for determining virtual flaw response signals, and means for displaying the virtual flaw response signals to the inspector. The means for processing probe output signals and injecting virtual flaw signals may comprise means for sending excitation signals to the probe from conventional nondestructive test instrumentation through a virtual flaw signal injection circuit, means for receiving the probe output signals by a virtual flaw signal injection circuit, means for computing virtual flaw signals by the control computer based on the probe positions, the stored geometry of the test piece and the stored positional map of virtual flaw signals for the test piece, means for combining the probe output signals and the virtual flaw signals from the control computer by the virtual flaw signal injection circuit for determining the virtual flaw response signals, and means for sending the virtual flaw response signals from the virtual flaw signal injection circuit to the conventional nondestructive test instrumentation for displaying the virtual flaw response signals to the inspector by the conventional nondestructive test instrumentation. The system may further comprise means for sensing nondestructive testing probe liftoff from the test piece, sending probe liftoff signals to the control computer, and using the probe liftoff signals for computing virtual flaw signals. The means for processing probe output signals and injecting virtual flaw signals may comprise means for sending excitation signals to the probe and receiving the probe output signals by conventional nondestructive test instrumentation, means for receiving output signals from the conventional nondestructive test instrumentation by the control computer, means for computing virtual flaw signals by the control computer based on the probe positions, the probe liftoff signals, the stored geometry of the test piece and the stored positional map of virtual flaw signals for the test piece, means for combining the conventional nondestructive test instrumentation output signals and the virtual flaw signals by the control computer for determining virtual flaw response signals, and means for sending the virtual flaw response signals from the control computer to a computer monitor for displaying the virtual flaw response signals to the inspector. The means for displaying the virtual flaw response signals may comprise displaying the virtual flaw response signals and an actual flaw response signals to the inspector. The system may further comprise displaying virtual flaws to an inspector on a computer monitor connected to the control computer for instructional training purposes.

In yet another embodiment of the present invention, a system for nondestructive testing with flaw simulation comprises conventional nondestructive testing instrumentation including a probe connected to a simulation means, means for tracking positions of the probe with respect to a test piece and providing a probe position tracking signal to the simulation means, means for sensing liftoff of the probe from the test piece and providing a probe liftoff signal to the simulation means, and the simulation means comprising a computer including means for monitoring the probe position tracking signal, means for monitoring the probe liftoff signal, means for storing virtual flaw signals that are a function of probe position, means for providing virtual flaw signals as a function of the probe position tracking signal and the probe liftoff signal for combining with nondestructive testing instrumentation probe signals, means for combining a signal from the conventional nondestructive testing instrumentation with a simulated virtual flaw signal from the simulation means, and means for displaying the combined signals to an inspector. The combining means may be a virtual flaw signal injection circuit for receiving virtual flaw signals and output signals from the probe, the virtual flaw injection circuit providing a combined signal to the conventional nondestructive testing instrumentation, and the displaying means may be the conventional nondestructive testing instrumentation for displaying actual and virtual flaws. The system may further comprise a display means connected to the simulation means for displaying simulated virtual flaw signals for instructional training purposes The combining means may be the simulation means for receiving an output signal from the conventional nondestructive testing instrumentation to be combined with the simulated virtual flaw signal, and the displaying means may be a computer monitor connected to the simulation means for displaying actual and virtual flaws. The conventional nondestructive testing instrumentation may be based on eddy current nondestructive testing methods. The conventional nondestructive testing instrumentation may based on ultrasonic nondestructive testing methods. The virtual flaw signals may be created from pre-measured signals from actual defects. The virtual flaw signals may be created from a mathematical model.

Although the present invention is described as an implementation of an NDT simulator for eddy current testing, it may be similarly applied to other NDT instrumentation methods, such as ultrasonics.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
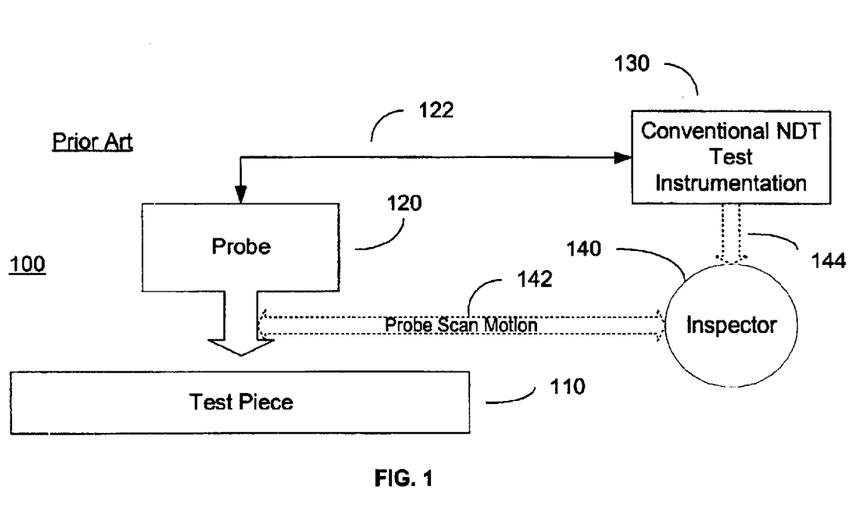
FIG. 1 shows a conventional NDT instrumentation block diagram.

Turning now to FIG. 1, FIG. 1 shows a conventional NDT instrumentation block diagram 100 that is typical of current technology. A probe 120 is caused to scan 142 a test piece 110 by an inspector 140. The probe 120 may be based on various technologies, including but not limited to eddy current and ultrasonic technologies. The probe 120 receives an excitation signal from the associated conventional NDT test instrumentation 130 and transmits an output signal to the associated conventional NDT test instrumentation 130 over a cable connection 122. The test instrumentation 130 provides a display to the inspector 140 for viewing the test results 144. This prior art configuration 100 does not allow for probability of detection testing using artificial flaw signals, instructional training, monitoring inspections when the incidences of flaws are infrequent, or for ensuring proper scan coverage.

Figure 2:
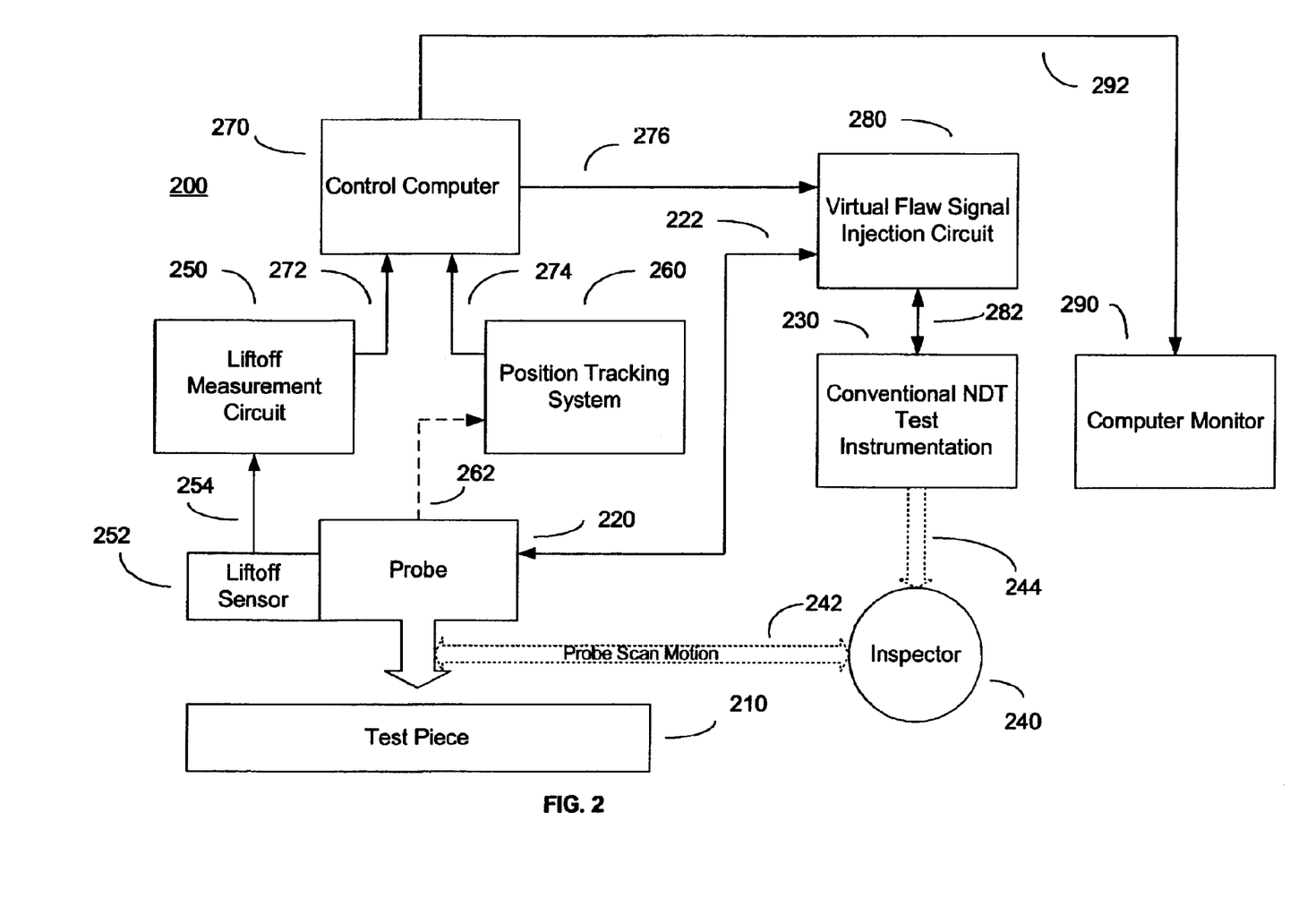
FIG. 2 shows a system block diagram of an embodiment of the present invention.

Turning to FIG. 2, FIG. 2 shows a system block diagram 200 of an embodiment of the present invention. A probe 220 is caused to scan 242 a test piece 210 by an inspector 240. The probe 220 may be based on various technologies, including but not limited to eddy current and ultrasonic technologies. The probe 220 is connected to a virtual flaw signal injection circuit 280 by a cable or cables 222. The virtual flaw signal injection circuit 280 is connected to conventional NDT test instrumentation 230 by a connection 282. The excitation signal for the probe 220 is transmitted to the probe 220 from the virtual flaw signal injection circuit 280 over the cable connection 222. The test instrumentation 230 provides a display to the inspector 240 for viewing the test results 244, which may include actual and simulated flaws. Although not required for ultrasonic testing, a liftoff sensor 252 may be affixed to the probe 220 to measure the proximity of the probe 220 to the work piece 210. The liftoff sensor 252 has a connection 254 to a liftoff measurement circuit 250, which conditions and converts a liftoff sensor signal 254 into a computer readable format. The liftoff measurement circuit 250 has a connection 272 for sending the computer readable liftoff measurement signal 272 to a control computer 270. The liftoff sensor 252 may be based on various technologies, including but not limited to eddy current, capacitive and optical technologies. Also associated with the probe 220 is a probe position tracking system 260 that includes a fixed positional arrangement 262 with the probe position. The position tracking system 260 transmits a computer readable probe position signal 274 to the control computer 270. The position tracking system 260 may be any one of several commercially or otherwise available systems that are suitable for this application. The control computer 270 uses the liftoff signal, the position tracking signal, and a stored table relating artificial flaws to probe position in order to compute a virtual flaw signal based on probe position. When the probe 220 is in a position relating to a virtual flaw position, the control computer 270 transmits the artificial flaw signal 276 to a virtual flaw signal injection circuit 280. The artificial flaw signal injection circuit 280 combines the artificial flaw signal 276 from the control computer 270 with an actual probe signal 222 from the probe 220 and sends the combined signal 282 to the conventional NDT test instrumentation 230, where the results may be viewed 244 by an inspector 240. The probe 220 may comprise various configurations, including but not limited to the following: a single element probe for transmitting excitation signals and receiving test signals; a dual element probe for transmitting excitation signals on one element and receiving test signals on a second element; a dual element probe for transmitting and receiving test signals an each element, with the elements connected differentially; and a triple element probe for transmitting excitation signals on one element and receiving test signals differentially on two other elements. The system 200 shown in FIG. 2 allows for instructional training of an inspector 240 with a conventional computer monitor 290 having a connection 292 to the control computer 270. The system 200 also provides for monitoring inspections when the incidences of flaws are infrequent, probability of detection determination, and for ensuring proper scan coverage of the test piece 210.

To use the system shown in FIG. 2, the inspector 240 moves the probe 220 over the test piece 210, as in a conventional inspection procedure. The probe 220 is mechanically coupled to a position tracking system 260 that reports probe coordinates to the control computer 270. The control computer 270 is programmed with the dimensions of the test piece 210, and a positional map of virtual flaw signals to appear on the test piece 210. The artificial flaw responses are developed from a model of the NDT instrumentation response or from premeasured signals. When the probe 220 reaches designated positions, the control computer 270 commands the signal injection circuit 280 to create a flaw response signal on the probe input line 282 to the NDT test instrumentation 230. The inspector 240 may then view the flaw response 244 on the instrumentation display means. Since the NDT test instrumentation 230 may be sensitive to liftoff of the probe 220, a liftoff sensor 252 may be affixed to the probe 220 to monitor probe liftoff. The control computer 270 may use the liftoff signal 274 to provide a liftoff corrected response to the inspector 240.

Figure 3:
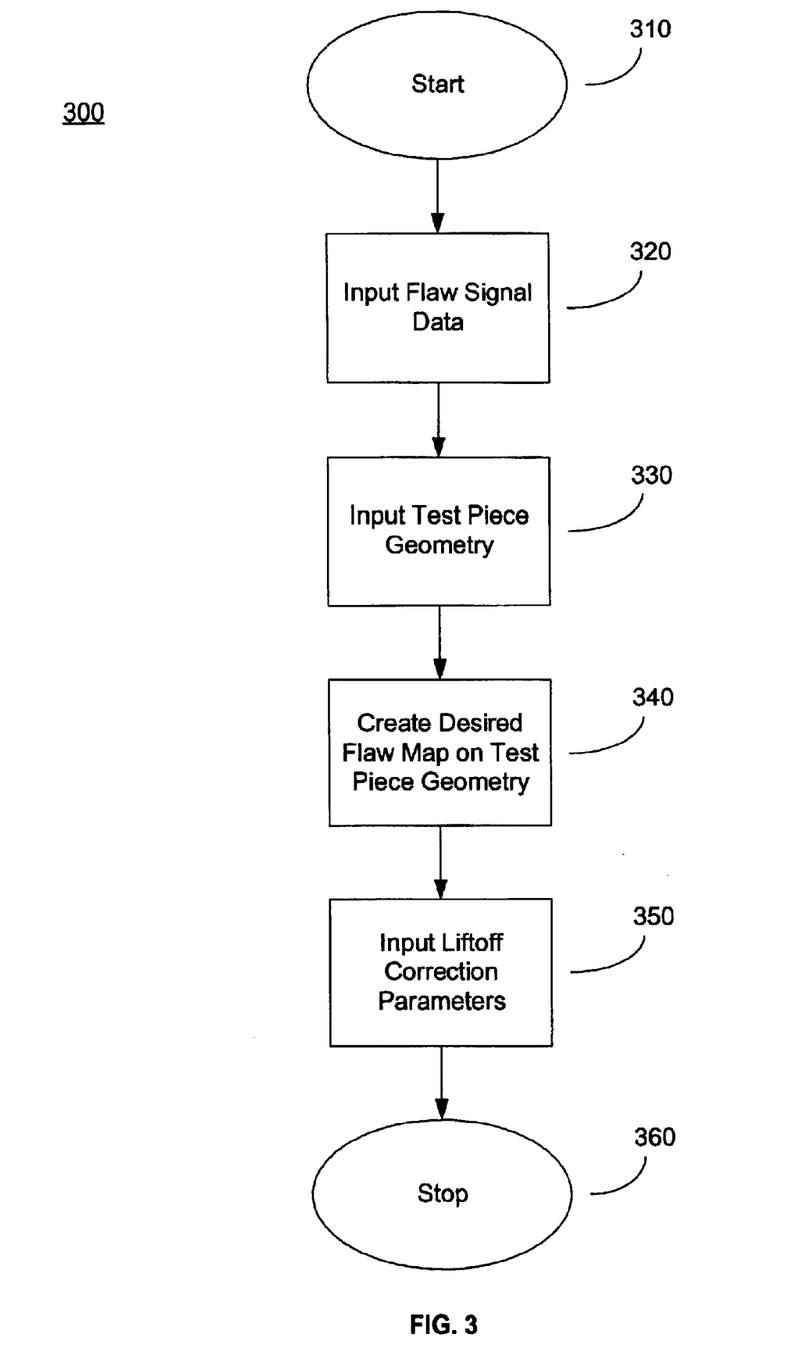
FIG. 3 depicts a flow diagram of a setup mode for the system depicted in FIG. 1.

Turning now to FIG. 3, FIG. 3 depicts a computer flow diagram of a setup mode 300 for the system depicted in FIG. 1. This initialization process 300 is started 310 and comprises inputting flaw signal data 320, inputting a test piece geometry 330, creating a desired flaw map on the test piece geometry 340, and inputting liftoff correction parameters 350. Once this process is complete, the system may start processing data in a run mode.

Figure 4:
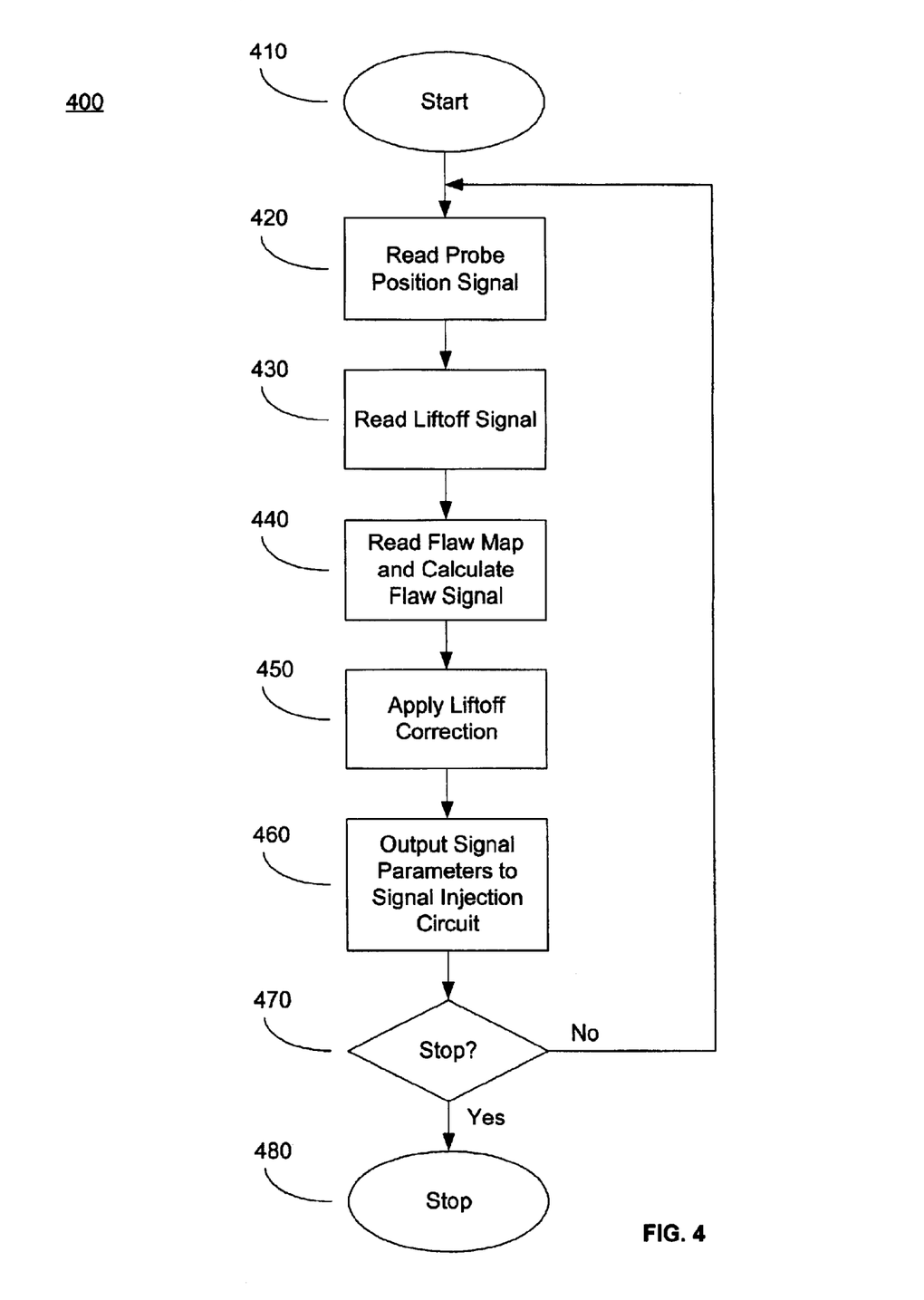
FIG. 4 depicts a flow diagram of a run mode for the system depicted in FIG. 1.

Turning to FIG. 4, FIG. 4 depicts a computer flow diagram of a run mode 400 for the system depicted in FIG. 1. When a run mode 400 is started 410, the run mode 400 comprises reading a probe position signal 420, reading a liftoff signal 430, and reading a flaw map and calculating flaw signals 440. A liftoff correction is applied to the calculated flaw signal 450, and the signal parameters are output to a signal injection circuit 460. If the run mode is not stopped 470, it will continue to cycle through the run process 400.

Figure 5:
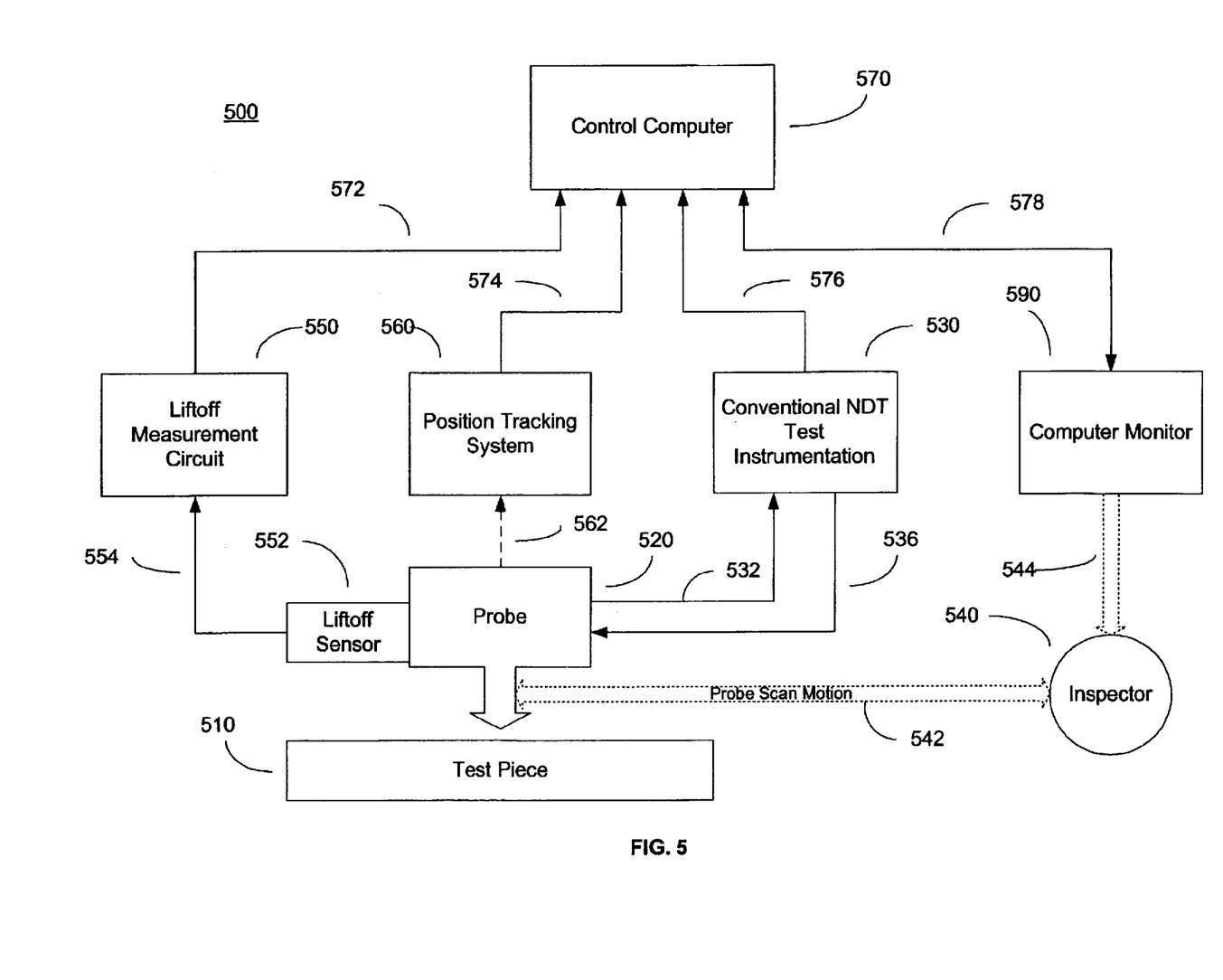
FIG. 5 shows a system block diagram of another embodiment of the present invention.

Turning now to FIG. 5, FIG. 5 shows a system block diagram of another embodiment 500 of the present invention. This embodiment 500 does not require a flaw injection circuit as the embodiment 200 shown in FIG. 2. In this embodiment 500, a computer monitor 590 connected to a control computer 570 is configured to appear as a virtual NDT test instrumentation display means. The signal output 576 of the NDT test instrumentation 530 is transmitted to the control computer 570, where virtual flaw information is added to this signal 576 to form a composite signal 578. The composite signal 578 is then transmitted to the computer monitor 590, which the inspector 540 views as a virtual NDT instrument display instead of an NDT instrument display.

A more detailed description of FIG. 5 shows probe 520 that is caused to scan 542 a test piece 510 by an inspector 540. The probe 520 may be based on various technologies, including but not limited to eddy current and ultrasonic technologies. The probe 520 receives an excitation signal from the associated conventional NDT test instrumentation 530 over a drive connection 536, and transmits an output signal 532 to the associated conventional NDT test instrumentation 530. The test instrumentation 530 provides an output signal 576 to the control computer 570. A liftoff sensor 552 is affixed to the probe 520 to measure the proximity of the probe 520 to the work piece 510. The liftoff sensor 552 has a connection 554 to a liftoff measurement circuit 550, which conditions and converts a liftoff sensor signal 554 into a computer readable format. The liftoff measurement circuit 550 has a connection 572 for sending the computer readable liftoff measurement signal 572 to the control computer 570. The liftoff sensor 552 may be based on various technologies, including but not limited to eddy current, capacitive and optical technologies. Also associated with the probe 520 is a probe position tracking system 560 that includes a fixed positional arrangement 562 with the probe position. The position tracking system 560 transmits a computer readable probe position signal 574 to the control computer 570. The position tracking system 560 may be any one of several commercially or otherwise available systems that are suitable for this application. The control computer 570 uses the liftoff signal, the position tracking signal, and a stored table relating artificial flaws to probe position in order to compute a virtual flaw signal based on position. The artificial flaw signal is combined with the output signal 576 from the NDT test instrumentation by the control computer 570, which sends the combined signal 578 to the computer monitor 590 where the results may be viewed 544 by an inspector 540. The system 500 shown in FIG. 5 also allows for instructional training of an inspector 540 with the computer monitor 590 having a connection 578 to the control computer 570. The system 500 also provides for determining probability of detection using artificial flaw signals, monitoring inspections when the incidences of flaws are infrequent, and for ensuring proper scan coverage of the test piece 510.

To use the system shown in FIG. 5, the inspector 540 moves the probe 520 over the test piece 510, as in a conventional inspection procedure. The probe 520 is mechanically coupled to a position tracking system 560 that reports probe coordinates to the control computer 570. The control computer 570 is programmed with the dimensions of the test piece 510, and locations and sizes of artificial flaws within the test piece 510. The artificial flaw responses are developed from a model of the NDT instrumentation response or from premeasured signals. When the probe 520 reaches designated positions, the control computer 570 creates an NDT composite signal by combining NDT test instrumentation signal with the flaw response signal. The inspector 540 may then view test results on the computer monitor 590, which may include actual and simulated flaws. Since the NDT test instrumentation 530 may be sensitive to liftoff of the probe 520, a liftoff sensor 552 may be affixed to the probe 520 to monitor probe liftoff. The control computer 570 may use the liftoff signal 574 to provide a liftoff corrected response to the inspector 540.

Figure 6:
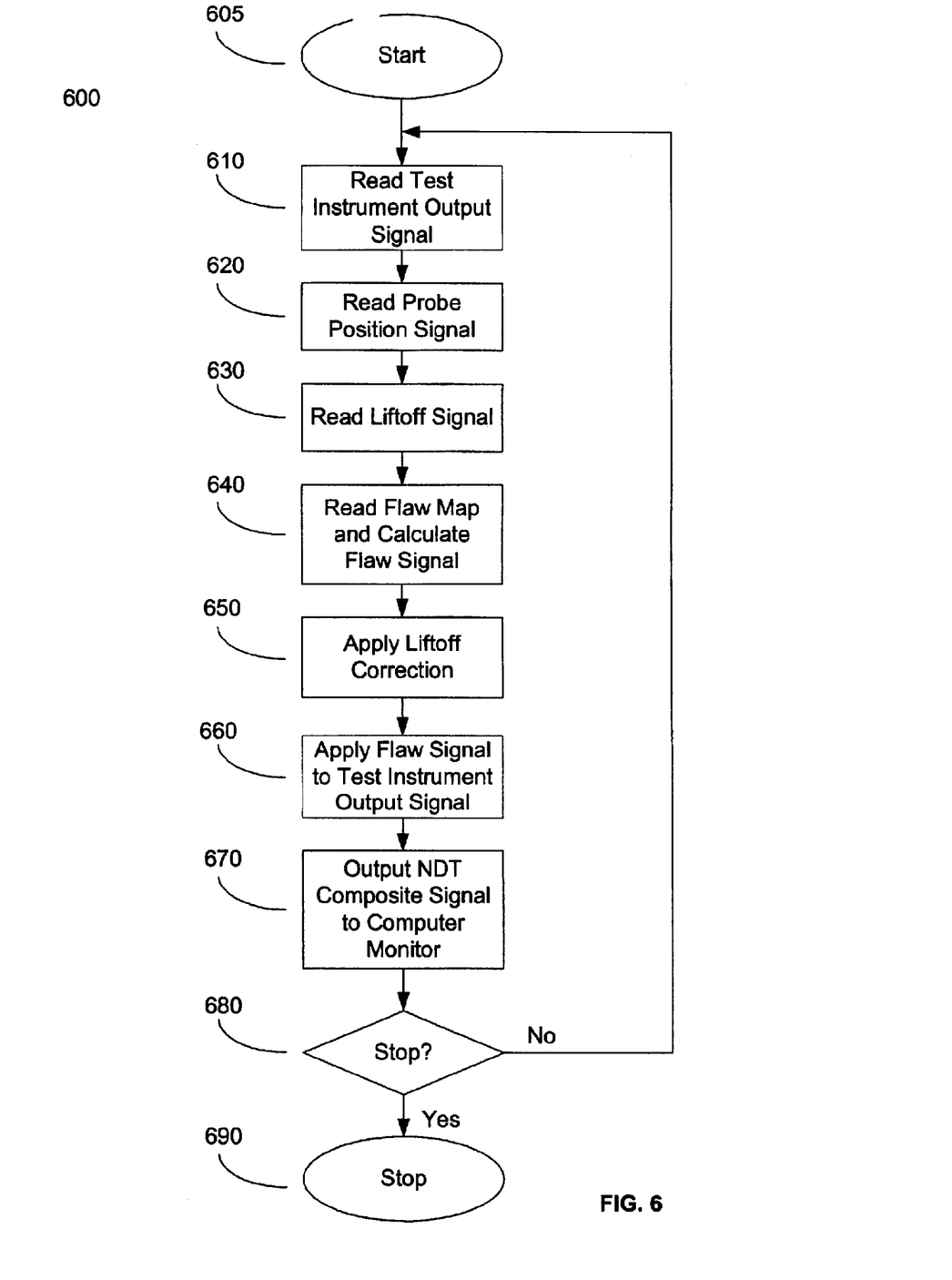
FIG. 6 depicts a flow diagram of a run mode for the system depicted in FIG. 5.

Turning to FIG. 6, FIG. 6 depicts a computer flow diagram of a run mode 600 for the system depicted in FIG. 5. A setup mode for the system shown in FIG. 5 is the same as that shown for the system of FIG. 2 in FIG. 3. When the mode is started 605, a test instrument output signal is read 610, a probe position signal is read 620, and a probe liftoff signal is read 630. A flaw map stored in computer memory is read and a flaw signal is calculated 640. Liftoff correction is applied 650 and the artificial flaw signal is combined with the NDT test instrument signal to form an NDT composite signal 660. The NDT composite is then sent to the computer monitor 670 for viewing by an inspector. If the run mode is not stopped 680, it will continue to cycle through the run process 600.

Although the present invention has been described in detail with reference to certain preferred embodiments, it should be apparent that modifications and adaptations to those embodiments might occur to persons skilled in the art with departing from the spirit and scope of the present invention.

What is claimed is:

1. A method for nondestructive testing with flaw simulation, comprising the steps for:

storing a geometry of a test piece and a positional map of virtual flaw signals for the test piece in a control computer;

causing a nondestructive testing probe to scan a test piece by movement of the probe over the test piece by an inspector;

tracking nondestructive testing probe positions with respect to the test piece and sending probe position signals to the control computer;

processing nondestructive testing probe output signals and displaying the processed signals to the inspector;

injecting virtual flaw signals into the processed probe output signals based on the probe positions, the stored test piece geometry and the stored positional map for determining virtual flaw response signals; and displaying the virtual flaw response signals to the inspector.

2. The method of claim 1, wherein the steps for processing probe output signals and injecting virtual flaw signals comprise the steps for:

sending excitation signals to the probe from conventional nondestructive test instrumentation through a virtual flaw signal injection circuit;

receiving the probe output signals by a virtual flaw signal injection circuit;

computing virtual flaw signals by the control computer based on the probe positions, the stored geometry of the test piece and the stored positional map of virtual flaw signals for the test piece;

combining the probe output signals and the virtual flaw signals from the control computer by the virtual flaw signal injection circuit for determining the virtual flaw response signals; and sending the virtual flaw response signals from the virtual flaw signal injection circuit to the conventional nondestructive test instrumentation for displaying the virtual flaw response signals to the inspector by the conventional nondestructive test instrumentation.

3. The method of claim 2, further comprising sensing nondestructive testing probe liftoff from the test piece, sending probe liftoff signals to the control computer, and using the probe liftoff signals for computing virtual flaw signals.

4. The method of claim 3, wherein the steps for processing probe output signals and injecting virtual flaw signals comprise the steps for:

sending excitation signals to the probe and receiving the probe output signals by conventional nondestructive test instrumentation;

receiving output signals from the conventional nondestructive test instrumentation by the control computer;

computing virtual flaw signals by the control computer based on the probe positions, the probe liftoff signals, the stored geometry of the test piece and the stored positional map of virtual flaw signals for the test piece;

combining the conventional nondestructive test instrumentation output signals and the virtual flaw signals by the control computer for determining virtual flaw response signals; and sending the virtual flaw response signals from the control computer to a computer monitor for displaying the virtual flaw response signals to the inspector.

5. The method of claim 1, wherein the step for storing in a control computer comprises the steps for:

reading and storing virtual flaw signals data;

reading and storing the test piece geometry;

generating one or more positional maps of virtual flaw signals for the test piece; and reading liftoff correction parameters.

6. The method of claim 3, wherein the step for computing virtual flaw signals by the control computer comprises the steps for:

reading and storing the probe position signals;

reading and storing the liftoff signals;

reading and storing the positional map of virtual flaws;

calculating virtual flaw signals using the probe position signals and the positional map;

applying liftoff correction to the calculated virtual flaw signals; and sending the corrected virtual flaw signals to the virtual flaw signal injection circuit.

7. The method of claim 4, wherein the step for computing virtual flaw signals by the control computer comprises the steps for:

reading and storing the output signals from the conventional nondestructive test instrumentation;

reading and storing the probe position signals;

reading and storing the liftoff signals;

reading and storing the positional map of virtual flaws;

calculating virtual flaw signals using the probe position signals and the positional map;

applying liftoff correction to the calculated virtual flaw signals; and combining the corrected virtual flaw signals with the signals from the conventional nondestructive test instrumentation and sending the combined signals to the computer monitor.

8. The method of claim 1, wherein the nondestructive testing probe is selected from the group consisting of an eddy current probe and an ultrasonic probe.

9. The method of claim 3, wherein a liftoff sensor is selected from the group consisting of an eddy current sensor, a capacitive sensor and an optical sensor.

10. The method of claim 1, wherein the nondestructive testing probe is selected from the group consisting of a single element probe for receiving excitation signals and transmitting test signals, a dual element probe for receiving excitation signals on one element and transmitting test signals from a second element, and a triple element probe for receiving excitation signals on one element and transmitting test signals differentially from the other two elements.

11. The method of claim 1, wherein the step for displaying the virtual flaw response signals comprises the step for displaying the virtual flaw response signals and actual flaw response signals to the inspector.

12. The method of claim 3, further comprising the step for displaying virtual flaws to an inspector on a computer monitor connected to the control computer for instructional training purposes.

13. The method of claim 1, further comprising the step for deriving the positional map of virtual flaws from a model of conventional nondestructive test instrumentation responses.

14. The method of claim 1, further comprising the step for deriving the positional map of virtual flaws from actual premeasured flaw signals from conventional nondestructive test instrumentation.

15. A computer-readable medium containing instructions for controlling a computer system to implement the method of claim 1.

16. A computer-readable medium containing instructions for controlling a computer system to implement the method of claim 6.

17. A computer-readable medium containing instructions for controlling a computer system to implement the method of claim 7.

18. A system for nondestructive testing with flaw simulation, comprising:
means for storing a geometry of a test piece and a positional map of virtual flaw signals for the test piece in a control computer;
means for causing a nondestructive testing probe to scan a test piece by movement of the probe over the test piece by an inspector;
means for tracking nondestructive testing probe positions with respect to the test piece and sending probe position signals to the control computer;
means for processing nondestructive testing probe output signals and displaying the processed signals to the inspector;
means for injecting virtual flaw signals into the processed probe output signals based on the probe positions, the stored test piece geometry and the stored positional map for determining virtual flaw response signals; and
means for displaying the virtual flaw response signals to the inspector.

19. The system of claim 18, wherein the means for processing probe output signals and injecting virtual flaw signals comprises:
means for sending excitation signals to the probe from conventional nondestructive test instrumentation through a virtual flaw signal injection circuit;
means for receiving the probe output signals by a virtual flaw signal injection circuit;
means for computing virtual flaw signals by the control computer based on the probe positions, the stored geometry of the test piece and the stored positional map of virtual flaw signals for the test piece;
means for combining the probe output signals and the virtual flaw signals from the control computer by the virtual flaw signal injection circuit for determining the virtual flaw response signals; and
means for sending the virtual flaw response signals from the virtual flaw signal injection circuit to the conventional nondestructive test instrumentation for displaying the virtual flaw response signals to the inspector by the conventional nondestructive test instrumentation.

20. The system of claim 19, further comprising means for sensing nondestructive testing probe liftoff from the test piece, sending probe liftoff signals to the control computer, and using the probe liftoff signals for computing virtual flaw signals.

21. The system of claim 20, wherein the means for processing probe output signals and injecting virtual flaw signals comprises:

means for sending excitation signals to the probe and receiving the probe output signals by conventional nondestructive test instrumentation;
means for receiving output signals from the conventional nondestructive test instrumentation by the control computer;
means for computing virtual flaw signals by the control computer based on the probe positions, the probe liftoff signals, the stored geometry of the test piece and the stored positional map of virtual flaw signals for the test piece;
means for combining the conventional nondestructive test instrumentation output signals and the virtual flaw signals by the control computer for determining virtual flaw response signals; and
means for sending the virtual flaw response signals from the control computer to a computer monitor for displaying the virtual flaw response signals to the inspector.

22. The system of claim 18, wherein the means for displaying the virtual flaw response signals comprises displaying the virtual flaw response signals and an actual flaw response signals to the inspector.

23. The system of claim 20, further comprising displaying virtual flaws to an inspector on a computer monitor connected to the control computer for instructional training purposes.

24. A system for nondestructive testing with flaw simulation, comprising:
conventional nondestructive testing instrumentation including a probe connected to a simulation means;
means for tracking positions of the probe with respect to a test piece and providing a probe position tracking signal to the simulation means;
means for sensing liftoff of the probe from the test piece and providing a probe liftoff signal to the simulation means; and
the simulation means comprising a computer including:
means for monitoring the probe position tracking signal;
means for monitoring the probe liftoff signal;
means for storing virtual flaw signals that are a function of probe position;
means for providing virtual flaw signals as a function of the probe position tracking signal and the probe liftoff signal for combining with nondestructive testing instrumentation probe signals; and
means for combining a signal from the conventional nondestructive testing instrumentation with a simulated virtual flaw signal from the simulation means; and
means for displaying the combined signals to an inspector.

25. The system of claim 24, wherein:
the combining means is a virtual flaw signal injection circuit for receiving virtual flaw signals and output signals from the probe, the virtual flaw injection circuit providing a combined signal to the conventional nondestructive testing instrumentation; and
the displaying means is the conventional nondestructive testing instrumentation for displaying actual and virtual flaws.

26. The system of claim 24, further comprising a display means connected to the simulation means for displaying simulated virtual flaw signals for instructional training purposes.

27. The system of claim 24, wherein:

the combining means is the simulation means for receiving an output signal from the conventional nondestructive testing instrumentation to be combined with the simulated virtual flaw signal; and the displaying means is a computer monitor connected to the simulation means for displaying actual and virtual flaws.

28. The system of claim 24, wherein the conventional nondestructive testing instrumentation is based on eddy current nondestructive testing methods.

29. The system of claim 24, wherein the conventional nondestructive testing instrumentation is based on ultrasonic nondestructive testing methods.

30. The system of claim 24, wherein the virtual flaw signals are created from pre-measured signals from actual defects.

31. The system of claim 24, wherein the virtual flaw signals are created from a mathematical model.

* * * * *